United States Patent [19]
Alford

[11] 4,355,834
[45] Oct. 26, 1982

[54] WEDGE-SHAPED CAMPING TRAVEL TRAILER

[76] Inventor: Thomas E. Alford, 801 Redwater Rd., Texarkana, Tex. 75501

[21] Appl. No.: 177,274

[22] Filed: Aug. 11, 1980

[51] Int. Cl.³ .............................................. B62D 37/02
[52] U.S. Cl. ...................................... 296/15; 296/168; 296/172; 296/163
[58] Field of Search ................. 296/15, 168, 156, 162, 296/163, 161; D12/103

[56] References Cited

U.S. PATENT DOCUMENTS

| D. 220,478 | 4/1971 | Shelton | D12/103 |
| D. 231,344 | 4/1974 | Miller | D12/103 |
| D. 242,851 | 12/1976 | Sakow | D12/103 |
| 1,320,554 | 11/1919 | Houser | 296/168 |

OTHER PUBLICATIONS

Sears 1973 Catalog of Accessories for Mobile Homes, Recreational Vehicles, and Camper.

*Primary Examiner*—Robert R. Song
*Attorney, Agent, or Firm*—Dennis T. Griggs

[57] ABSTRACT

A recreation trailer has a wedge-shaped configuration to improve its aerodynamic properties, and enhance the utility of its interior design. From front to rear, the trailer expands in both height and width from approximately 6 feet at the front to approximately 8 feet at the rear. The floor of the trailer expands only in width, and the overall length of the trailer is approximately 14½ feet. The internal layout of the trailer is designed to insure the optimum utilization of space. A bedroom and dining area is provided in the smaller front end of the trailer with a bathroom and kitchen area in the larger rear end of the trailer.

1 Claim, 8 Drawing Figures

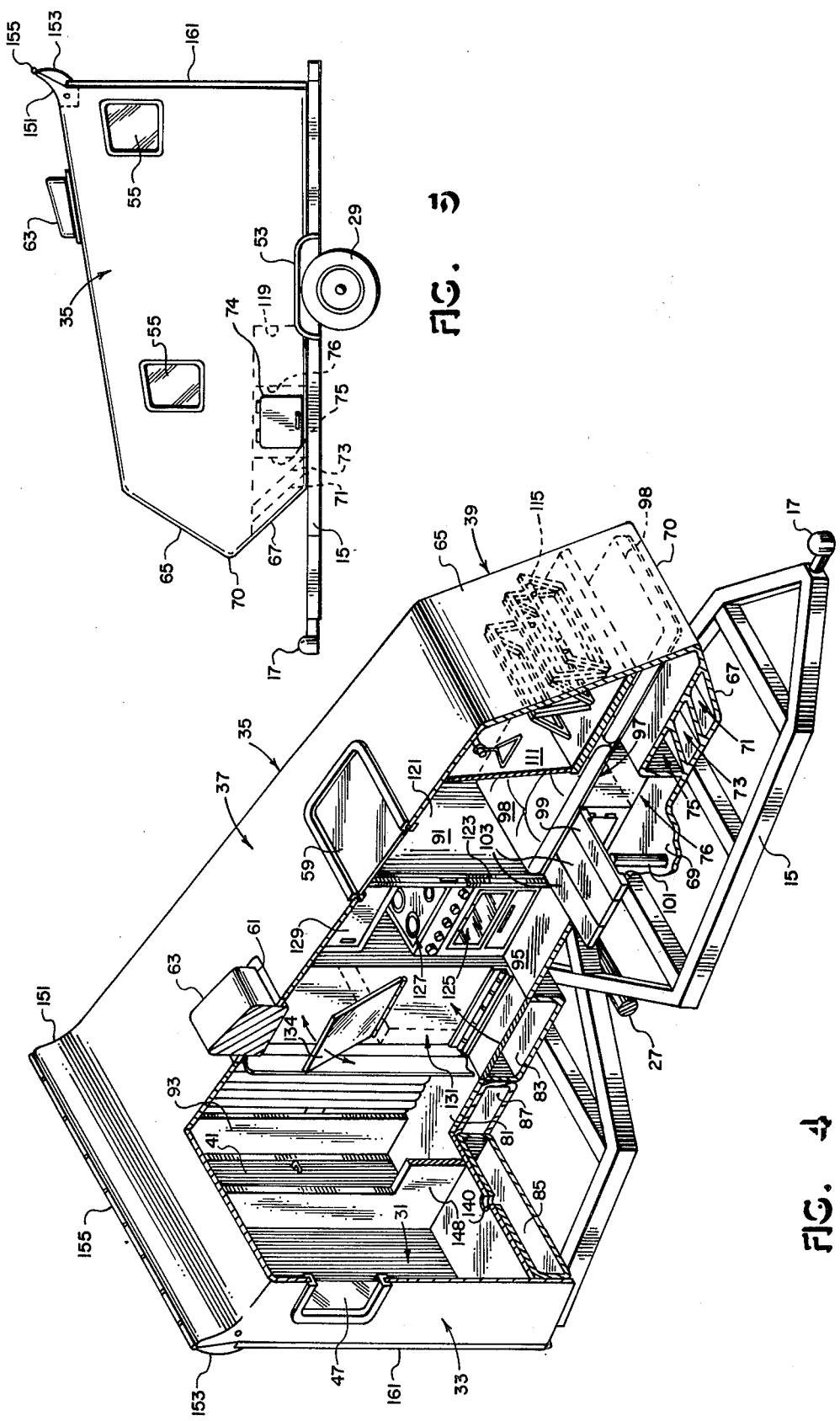

WEDGE-SHAPED CAMPING TRAVEL TRAILER

BACKGROUND OF THE INVENTION

1. Field of the Invention

This invention relates to recreational trailers.

2. Object of the Invention

The principal object of this invention is to provide a recreational trailer of novel external shape such as will optimize the aerodynamic properties of the trailer, making it safe, economical and practical for use with the smaller, lighter cars now being used. It is a further object to ensure that the trailer has a novel internal arrangement optimizing the utilization of space.

It will be appreciated that with increasing requirements for conservation of automotive fuel, a trailer which is more aerodynamic and can be smaller than conventional self-contained trailers because it makes a better utilization of space, represents a substantial advance in the art.

SUMMARY OF THE INVENTION

The foregoing objects are achieved by a trailer of wedge-shaped external configuration having increasing width and height from its front to its rear. The interior space of the trailer is so divided and arranged that bedroom and dining space is provided in the narrow, front end of the trailer and bathroom and kitchen space at the larger, rear end thereof.

As will be understood from the following detailed description, the form of the trailer according to the invention follows the various functions to be performed in it. The novel features which characterize the invention are defined in the appended claims. The foregoing and other objects, advantages and features of the invention will hereinafter appear, and for purposes of illustration of the invention, but not of limitation, an embodiment of the invention will now be described with reference to the accompanying drawings.

BRIEF DESCRIPTION OF THE DRAWINGS

FIG. 4 is a perspective view, with parts broken away to reveal interior detail, of the trailer shown in FIG. 1;

FIG. 5 is a left side elevation of the trailer shown in FIG. 1;

FIG. 8 is a perspective view of the trailer from the rear, showing the sun porch erected.

DETAILED DESCRIPTION OF THE PREFERRED EMBODIMENT

Figure 1:
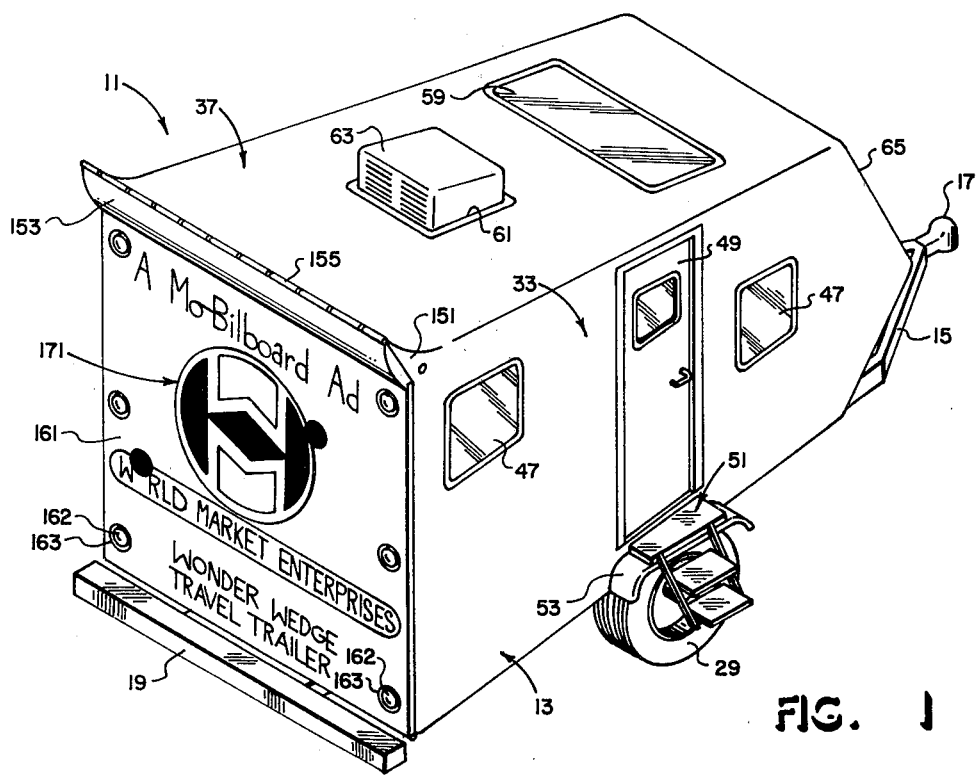
FIG. 1 is a perspective view of a recreational trailer constructed according to the teachings of the invention.

In the description which follows, like parts are referred to throughout the specifications and drawings with the same reference numerals. The drawings are not necessarily to scale and, in some instances, proportions have been exaggerated in order to depict certain features of the invention more clearly.

A recreational trailer 11 shown in the drawings comprises a body 13 approximately 14 feet 6 inches long mounted and secured on a frame 15. At its front end, the frame 15 projects beyond the body 13 and includes a towing hitch connection 17. At its rear end, the frame 15 has connected to it a bumper structure 19. The frame 15 is mounted on an axle 27 having road wheels 29 at its ends.

Figure 2:
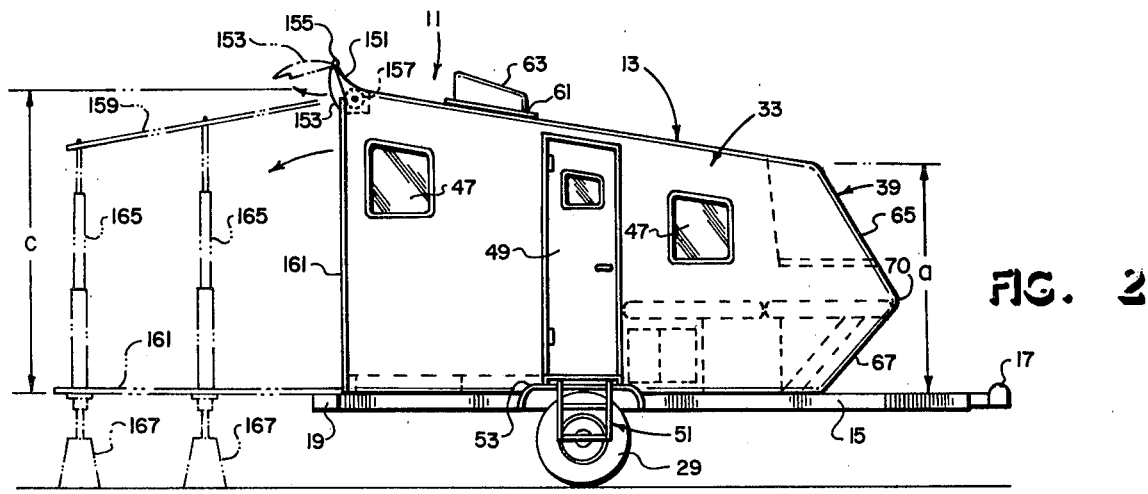
FIG. 2 is a right side elevation of the trailer shown in FIG. 1.
Figure 3:
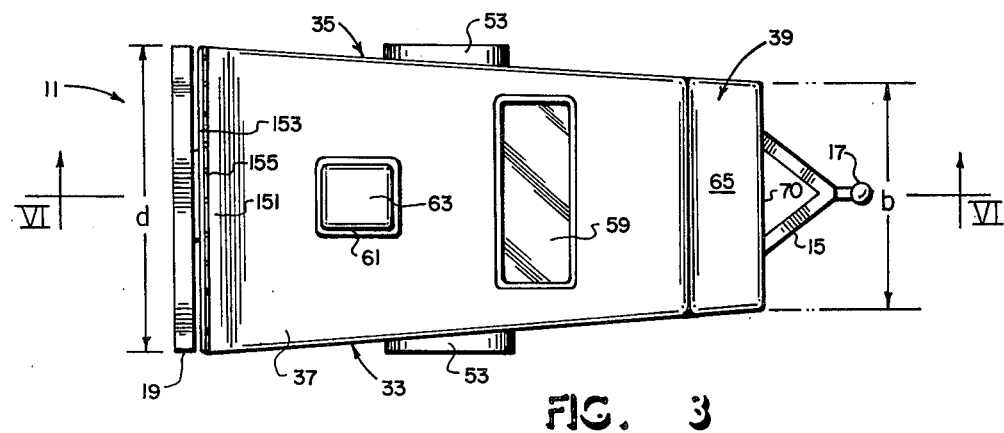
FIG. 3 is a top plan of the trailer shown in FIG. 1.

As best seen in FIGS. 2 and 3, the exterior of the body 13 is wedge-shaped. At its front end, the overall height a of the trailer is approximately 6 feet and the overall width b (FIG. 3) is also approximately 6 feet. At the rear end, the overall height c (FIG. 2) is approximately 8 feet and the overall width d (FIG. 3) is also approximately 8 feet.

The trailer body 13 comprises a rear wall 31, right and left sidewalls 33 and 35 respectively, a roof 37 and a front wall 39. As seen in FIG. 8, the rear wall 31 has a centrally located door opening 40 disposed above the bumper structure 19. In the opening is mounted a rear door 41. The right sidewall 33 has front and rear windows 47 and a door opening disposed intermediate the windows and above the road wheel 29. The opening is closed by a door 49. A set of three steps 51 is removably mounted on a right side wheel housing 53 to give access to the interior of the body via the door 49. The left sidewall 35 has front and rear windows 55. The roof 37 has a window 59 just forward of the transverse center line of the trailer and an opening 61 aft of the transverse center line in which is accomodated an air conditioning unit 63. The front wall 39 comprises an upper portion 65, which extends downwardly and forwardly from the roof 37 and a lower portion 67 which extends downwardly and rearwardly from the upper portion 65 to join a front floor portion 69 of the body 13 (See FIG. 4). The upper front wall portion 65 and the lower front wall 67 meet at a vertex 70. It will be appreciated that this configuration of the front wall adds to the aerodynamic properties of the trailer.

Figure 6:
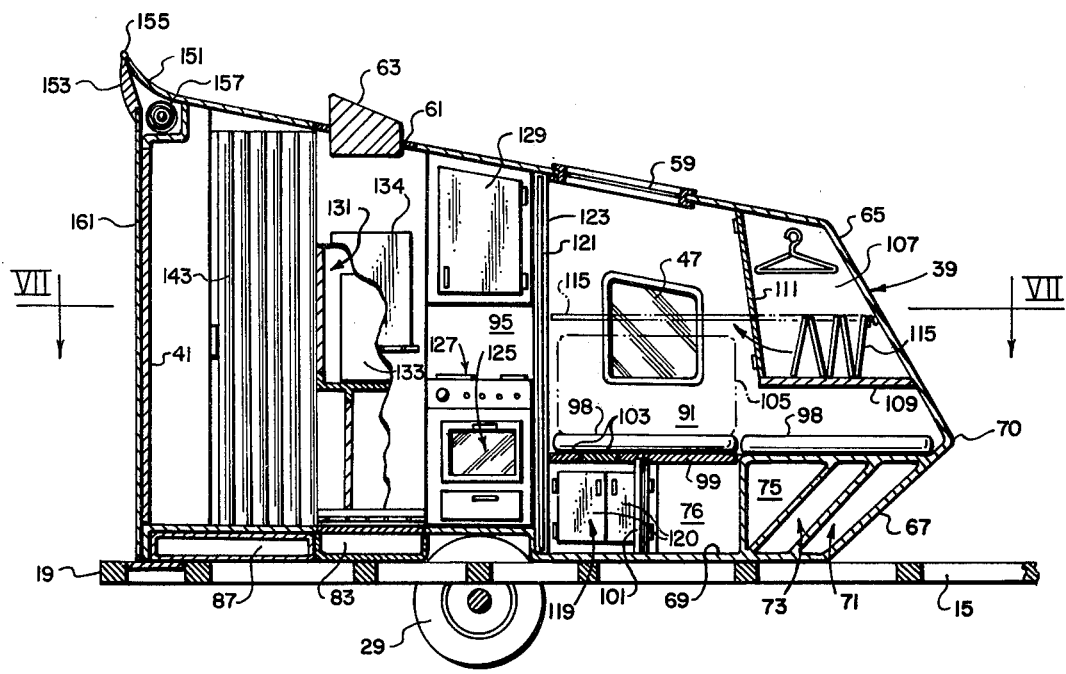
FIG. 6 is a vertical section on the line 6—6 in FIG. 3.

As seen best in FIGS. 4 and 6, the floor of the trailer comprises the front portion 69. Located at its forward end are three compartments 71, 73, and 75, which house, respectively, a propane gas tank, a fresh water tank, and an auxillary storage space for storing garden hose, or luggage, for example. The approximate dimensions of the tanks are 6 inches wide by 24 inches high by 27 inches long. Access to the tanks is provided by a hinged panel 74, in the external side of the wall 35, which also gives access to an additional storage compartment 76.

To the rear of the front floor area is a raised portion 81 of the floor under which are disposed a storage compartment 83 and, at the rear on the right and left side respectively, a waste water tank 85 and a soil tank 87 which receive waste from a toilet as described below.

The interior of the trailer body 13 is divided into a sleeping and dining area 91, disposed at the front of the body, a bathroom area 93, disposed at the rear of the body and a centrally disposed kitchen and utilities area 95.

Figure 7:
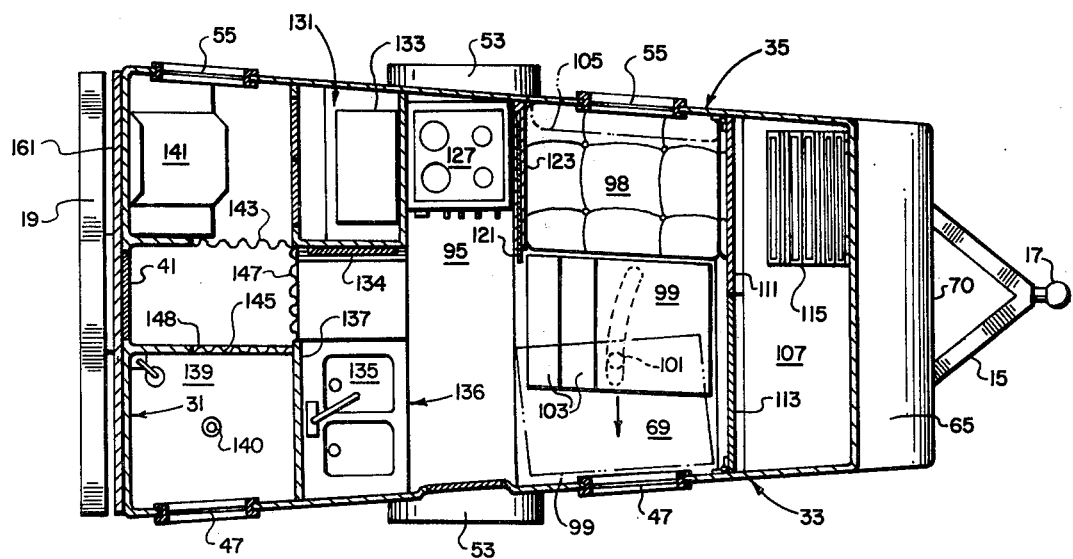
FIG. 7 is a horizontal section on the line 7—7 of FIG. 6.
Figure 3:
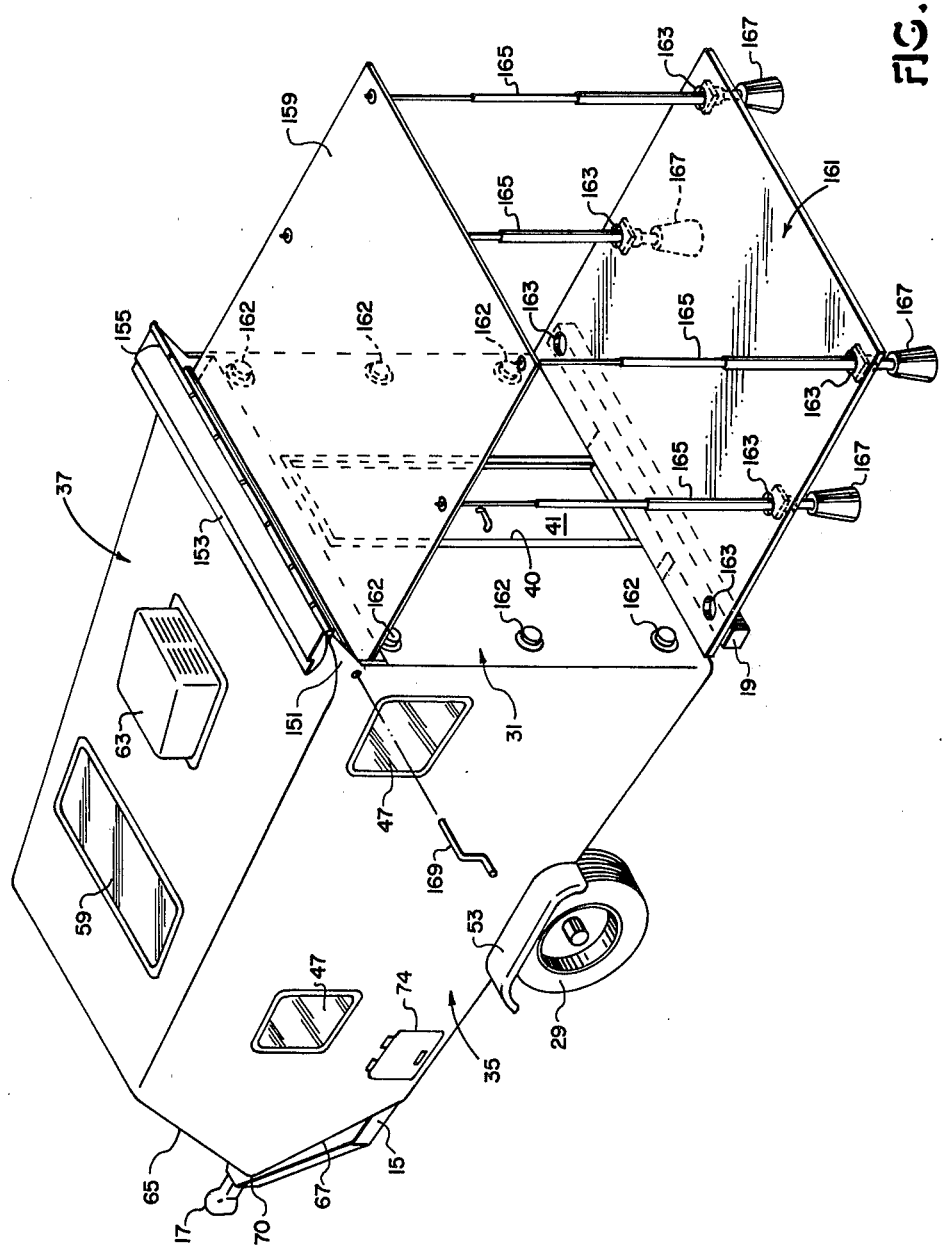

In the sleeping area 91 is a platform 97 approximately 84 inches long by 30 inches wide, which is located with one side adjoining the left sidewall 35 of the body and one end against the front wall 39 of the body. The platform 97 is raised from the floor 69 and is covered by a pair of cushions 98. Next to the platform 97 is a table top 99, (see FIG. 7) 60 inches by 30 inches, which is slidably mounted on a pedestal 101 which enables the table top 99 to be positioned selectively in three different positions. In the first of these, the table top 99 is at the same level as the platform 97 and is positioned contiguously thereto. In the second position the table top 99 is moved laterally away from the platform 97 to a position against the right side wall 33. In this position the table top 99 functions either as a coffee table or as a single bed. In the third position the table may be raised on its pedestal to serve as a dinette. A dual drop leaf table section 103, 24 inches by 30 inches, is disposed at a position such that when the table top 99 is in its first position, the table top 99 and table section 103 cooperate with the permanent base 71, 73, and 75 to form a single support surface approximately 30 inches by 84 inches adjoining the platform 97 and forming therewith a base for a large 60×84 inch double bed. Another split cushion 105 is provided which serves both as a mattress section for the second half of the large bed and, when the table top 99 is in its second or third positions, as a back rest for a sofa formed by the bed platform 97 and the cushions 98.

At the front of the sleeping area, above the bed platform 97, is a closet 107, 30 inches deep, extending across the width of the trailer. The closet 107 comprises a base 109 spaced 12 inches above the platform 97 and hinged latchable doors 111 and 113 which carry mirrors on their outer sides. The closet 107 contains a folding, accordion bed frame 115 which unfolds along the length of the wall above the bed platform 97. With the doors 111 and 113 open, the base 109 functions as a single bed.

Beneath the platform 97, at its rear end, is a storage compartment 119 accessible from the interior of the trailer through doors 120 when the tabletop 99 is in its second position.

A floor-to-roof wall 121 at the front of the sleeping area 91 extends outwardly from the left side wall 35 for approximately 30 inches and contains within it a separate, slidable wall 123 that can be extended another 30 inches into the trailer interior.

In the center of the body, over the left wheel well and adjacent to the left side wall 35, is an oven 125 on top of which is mounted a range 127. Above and spaced from the range 127 is a storage cabinet 129. The remaining part of the floor of the utility area 95 is clear to give space for a person working in that area.

Immediately to the rear of the range 127 and adjacent to the left side wall 35 is a pantry 131 of approximate dimensions 24 inches by 30 inches by 90 inches, containing, in its upper section, a furnace and hot water tank 133. On the door of the pantry 131 is a 24-inch by 24-inch hinged counter top 134, which can be folded between a vertical, stowed position and a horizontal, working position. Immediately opposite the pantry 131 on the right side of the body 13 is a pair of sinks 135 below which is provided a refrigerator 136. To the rear of the sinks 135 and refrigerator 136 is a floor-to-ceiling wall 137 which is mirrored above the sinks.

The space to the rear of the wall 137 on the right side of the body 13 is a shower cubicle 139. A drain 140 in the floor of the shower cubicle 139 returns water used in the shower to the tank 85 enabling it to be used to flush a toilet 141. The toilet 141 is located at the rear of the body 13 on its left hand side, behind the rear wall of the pantry 131. The toilet can be closed off by means of a sliding door 143. In order to provide additional knee room for the users of the toilet 141, the bottom 36 inches of the rear wall of the pantry 131 is recessed by 6 inches.

A curtain 145 is provided to close off the shower cubicle 139, and a second curtain 147 is provided to extend between the rear of the pantry and the wall 137. A low wall 148 separates the shower cubicle 139 from the interior of the trailer enabling the cubicle 139 to be filled with a depth of water and used as a bath tub.

Along the top rear edge of the body 13 is an aerodynamic spoiler 151. As best seen in FIG. 8, the spoiler 151 includes a rear flap 153 connected to the main portion of the spoiler 151 by a piano hinge 155. Housed within the spoiler 151 is a roller 157 on which is stored an awning 159, which can be withdrawn from the roller 157 to provide shelter over the space immediately to the rear of the trailer 11. FIG. 8 illustrates this arrangement and also shows that across the rear of the body 13, on the outside of the rear wall 31 is an additional panel structure 161, which can be secured in a vertical position against the rear wall 31, eg. for when the trailer is being towed, but which can be folded down to a horizontal position in which it forms a patio area outside the rear door 41.

Appropriately sized and positioned openings 163 in the panel structure 161 enable the working light 162 of the trailer 11 to be visible when the panel structure 161 is in the vertical position. The openings 163 are internally threaded and can engage with telescopic aluminum masts 165, which support the awning 159 in its extended position, and with four adjustable ground support members 167 for supporting the structure 161 in its horizontal position. The masts 165 and support members 167 are stored inside the vehicle when not in use. A nylon screen (not shown) may be secured around the patio thus formed.

A crank handle 169 is detachably connected to the end of roller 157 to enable the awning 159 to be rolled back into the roller 157.

The outer surface of the panel structure is plywood covered by plexiglass and functions as a billboard carrying advertising or promotional material 171.

Although a preferred embodiment of the invention has been described in detail, it should be understood that various changes, substitutions and alterations can be made therein without departing from the spirit and scope of the invention as defined by the appended claims.

What is claimed is:

1. A trailer comprising a wheeled frame having a front end and a back end, a body having a roof and sidewalls mounted on the frame, said body and frame being wedge-shaped and said body having an increasing width and increasing height from the front end to the back end of said frame, and means at the front end of said frame for attaching the trailer hitch of a vehicle, said trailer including an awning mounted on a roller housed at the rear of the roof of the body and extendable therefrom to provide shelter over an area to the rear of the trailer, said body having an aerodynamic spoiler extending across the rear edge of the roof and having a hinged flap portion which can be opened to give access to a storage compartment, wherein said roller and awning are housed in said storage compartment.

* * * * *